July 16, 1968   A. N. SKEELS, SR., ET AL   3,392,815
UNSCRAMBLING AND ORIENTING APPARATUS
Filed July 14, 1966   4 Sheets-Sheet 1

INVENTORS
ARTHUR N. SKEELS, SR.
CARLTON P. WERNER
ANTHONY W. SZABO

BY  Larson and Taylor
ATTORNEYS

INVENTORS
ARTHUR N. SKEELS, SR.
CARLTON P. WERNER
ANTHONY W. SZABO

BY *Larson and Taylor*

ATTORNEYS

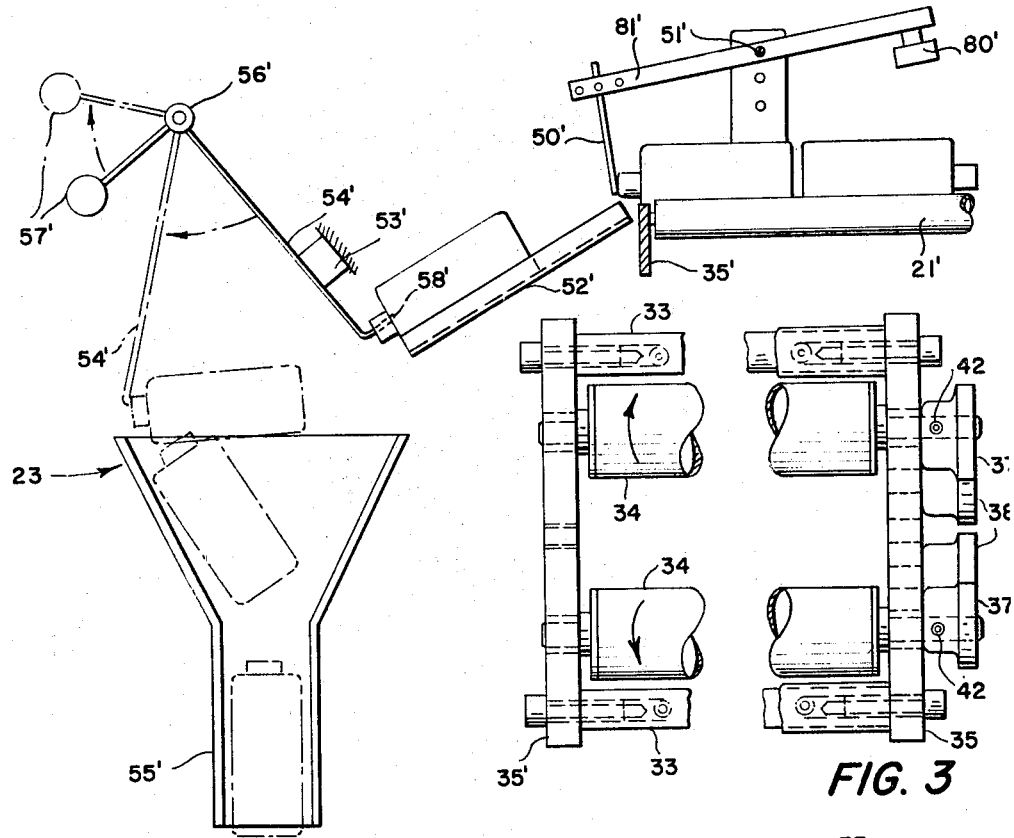
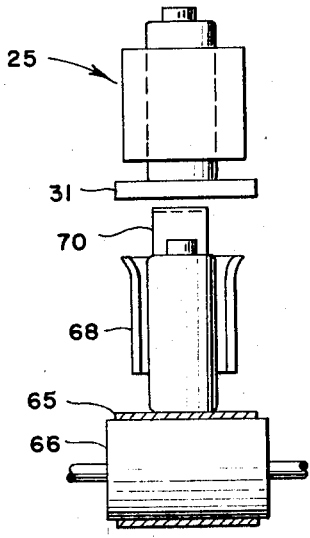
FIG. 6
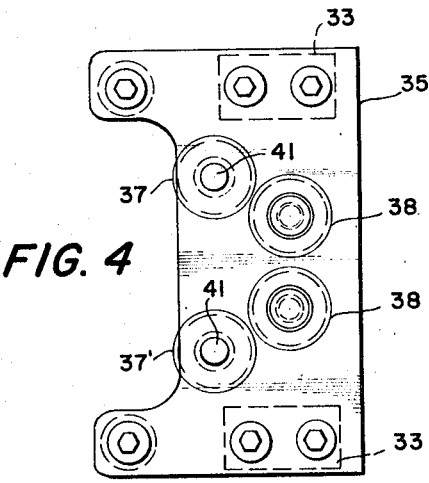
FIG. 3
FIG. 4
INVENTORS
ARTHUR N. SKEELS, SR
CARLTON P. WERNER
ANTHONY W. SZABO
BY *Larson and Taylor*
ATTORNEYS July 16, 1968  A. N. SKEELS, SR., ET AL  3,392,815
UNSCRAMBLING AND ORIENTING APPARATUS
Filed July 14, 1966  4 Sheets-Sheet 4
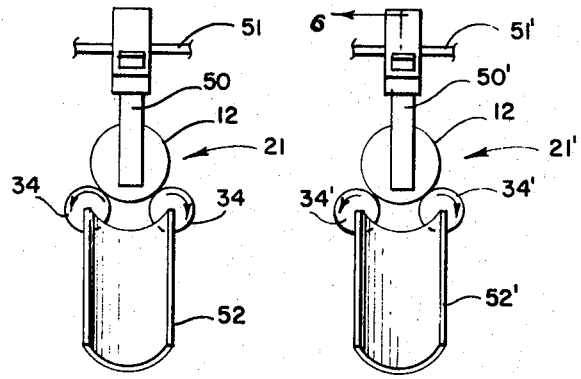
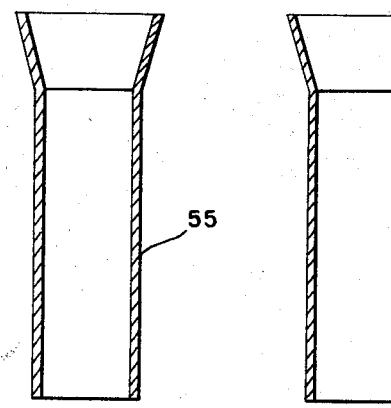
FIG. 5
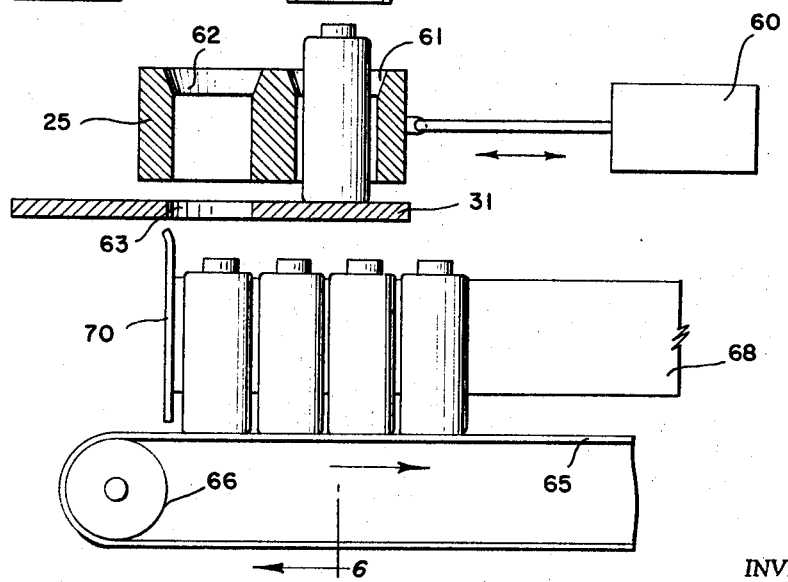
INVENTORS
ARTHUR N. SKEELS, SR.
CARLTON P. WERNER
ANTHONY W. SZABO
BY Larson and Taylor
ATTORNEYS 3,392,815
UNSCRAMBLING AND ORIENTING APPARATUS
Arthur N. Skeels, Sr., Livingston, Carlton P. Werner,
Orange, and Anthony W. Szabo, Livingston, N.J., assignors to The Unscrambler Corporation of New Jersey
Filed July 14, 1966, Ser. No. 565,126
14 Claims. (Cl. 198—33)

ABSTRACT OF THE DISCLOSURE

An apparatus for unscrambling and uniformly orienting a random group of open-end bottles. Suitable conveyors carry the bottles from random storage to an end-to-end arrangement. The bottles then pass through a gate, down a chute and through a vertical funnel to a receiving plate. A pivotable hook between the chute and the funnel reverses the orientation only of those bottles which pass down the chute open-end first. Two complete paths may be provided between storage and the receiving plate, wherein a shuttle block would collect the bottles after the funnels and would carry them, one at a time, to a common conveyor. Movement of the shuttle could control opening and closing of the said gates.

---

This invention relates to an apparatus for unscrambling and orienting containers which are received at the apparatus as a random group. In particular, this invention relates to a compact and versatile apparatus for unscrambling elongated containers, such as for example, bottles, and uniformly orienting them for delivery onto a feed away conveyor.

Machines for unscrambling and orienting articles such as elongated containers are, per se, well known in the art. However, the previous unscrambling and orienting machines have suffered from several major disadvantages. Many known unscrambling and/or orienting machines have been designed specifically for use with a particular packaging or other treatment station to which the oriented containers are to be delivered. Alternatively, those machines which have been designed for general use have been very bulky and/or of a very complicated structure. Too often, however, where one desires to install an unscrambling and orienting apparatus, space and the cost of the machines are primary considerations.

In contrast to the previously known unscrambling and orienting mechanisms the present invention provides an apparatus which is remarkably compact, economical, and simple in its operation when compared with previously known unscrambling and orienting machines which accomplish the same end result. Further, it is easily adaptable in conjunction with equipment where specific deliveries are involved.

The present apparatus comprises a plurality of components, some of which have been known per se in the prior art, such as the conveyor belts; and some components of which are new in and of themselves. However, these components when assembled to form the unscrambling and orienting apparatus of the present invention interrelate to provide a combination having new and unobvious results and distinct advantages not heretofore available.

Briefly, the invention comprises a hopper for receiving a random group of containers, a lift conveyor for carrying the containers from the hopper to an accumulation conveyor, the accumulation conveyor itself, which delivers the containers from the lift conveyor to an orienting mechanism, the orienting mechanism itself, and a means for delivering the containers, one at a time, from a plurality of paths within the orienting mechanism, to a feed away conveyor.

The lift conveyor is designed to carry the containers from the hopper vertically thereby taking up as little floor space as possible. The accumulation conveyor must be sufficiently versatile to receive containers of different sizes and shapes and transport them at different speeds; and the conveyor should be compact and simple in its construction. A driven roller conveyor has been found to be most suitable for this purpose.

The orienting mechanism should also be compact as well as versatile. The mechanism employed herein is particularly suitable since it is very compact, especially in view of this speed and versatility of operation. Orienting mechanisms are, by their nature, normally relatively large. Thus the novel compact orienting mechanism in the apparatus of the present invention allows a considerable reduction in the floor space required by the apparatus.

The orienting mechanism comprises a plurality of orienting paths, each path capable of receiving a row of containers from a separate accumulation conveyor and orienting the containers in that row. As discussed later, the containers in the separate orienting paths are subsequently brought together before delivery from the apparatus. The containers are received, initially, on a sloped chute. For purposes of illustration the invention will be described with respect to containers opened at one end and closed at the other end. However, the invention is not limited to use only with containers opened at one end and closed at the other. A rocker arm having a stop gate between the accumulation conveyor and the sloped chute allows only one container at a time to be delivered to the chute. A swivel hook is pivotally mounted and held by a latch so that the hook projects into the path of the containers as they progress down the sloped chute. When the container reaches the swivel hook, its weight and inertia release the latch and cause the swivel hook to swing outwardly from the chute. As containers approach the hook, closed bottom first, and release the hook, the closed bottom pushes the hook aside and falls, closed bottom first, from the chute. Alternatively, when a container approaches the hook with the open top facing downwardly, the hook enters the open top and as the hook swings outwardly it pulls the top of the container outwardly away from the chute so that the closed bottom can fall downwardly first. Each orienting device thereby directs the containers downwardly one at a time, closed bottom first, where they are received by a downwardly directed funnel. A shuttle block moves below all of the funnels of the orienting paths to receive the containers falling from the funnels, one at a time, and to deliver the containers, one at a time, to a feed away conveyor. A fixed plate is mounted between the shuttle block and the feed away conveyor and has an opening therein for allowing the containers to fall, one at a time, onto each feed away conveyor.

In the operation of the device, the feed away conveyor belt is first set to convey containers at a speed required by the operation to which the uniformly oriented containers are to be delivered. The speed of the conveyor determines the speed at which the shuttle block will move beneath the funnels to receive containers and deliver them to the feed away conveyor belt. The movement of the shuttle block in turn controls the operation of the rocker arm stop gate. In this manner a plurality of orienting paths (as for example two paths in the presently disclosed system) may be operated in timed sequence to deliver oriented containers to a single position on a feed away conveyor belt.

By providing a dual path orienting mechanism for delivery of containers to the same point on a conveyor the present apparatus effectively doubles the delivery speed of the mechanism. If only one path were provided, the upper limit of the delivery speed of the aparatus would be limited by the "bottleneck" of the apparatus. For instance, in the present apparatus the "bottleneck" might be at the swivel hook since this is the only place where the containers deviate from a direct path (and even then, only containers that approach the swivel hook "open end down"). Since the shuttle can collect the oriented containers from the two paths (for delivery to a single point) at a speed greater than one-half the time delay caused by the swivel hook, then the effect of a dual path orienting system is to effectively double the delivery speed of the apparatus.

It is important to understand the interrelationship of the various components of the apparatus which provide the compact and highly versatile unscrambling and orienting apparatus. For example the lift conveyor is arranged vertically to take up as little floor space as possible. The accumulation conveyor is of the driven roller type thereby taking up a minimum of space considering that it must be adaptable for use with containers of many different sizes and shapes. Next it will be seen that the orienting mechanism is extremely compact and simple, having relatively few moving parts. The speed of the overall apparatus is doubled by adding a second (or increased proportionately by adding still other) accumulation conveyor and orienting path. The reciprocating shuttle mechanism thereby acts in combination with the compact orienting device and the plurality of accumulating conveyors to rapidly recombine the paths of containers for delivery to a location on the take away conveyor.

It is an object of this invention to provide an apparatus for orienting elongated containers, which is extremely simple in its operation.

Another object of this invention is to provide an unscrambling and orienting apparatus which carries the containers through the apparatus in a plurality of paths and rapidly and efficiently combines the paths for delivery to a position on a feed away conveyor.

It it another object of this invention to provide an unscrambling and orienting apparatus which is simple, compact, and versatile so that it may be combined with existing feeding and conveying systems conveniently and at a minimal cost.

Other objects and advantages of the present invention will become apparent by the detailed description together with the accompanying drawings in which:

FIG. 3 is a plan view of a roller conveyor employed in the apparatus of FIGS. 1 and 2.

FIG. 4 is an end view of the roller conveyor shown in FIG. 3.

FIG. 5 is an expanded view of an orienting mechanism employed in the apparatus of FIGS. 1 and 2.

FIG. 6 is an expanded view of the orienting mechanism taken along line 6—6 of FIG. 5.

Figure 1:
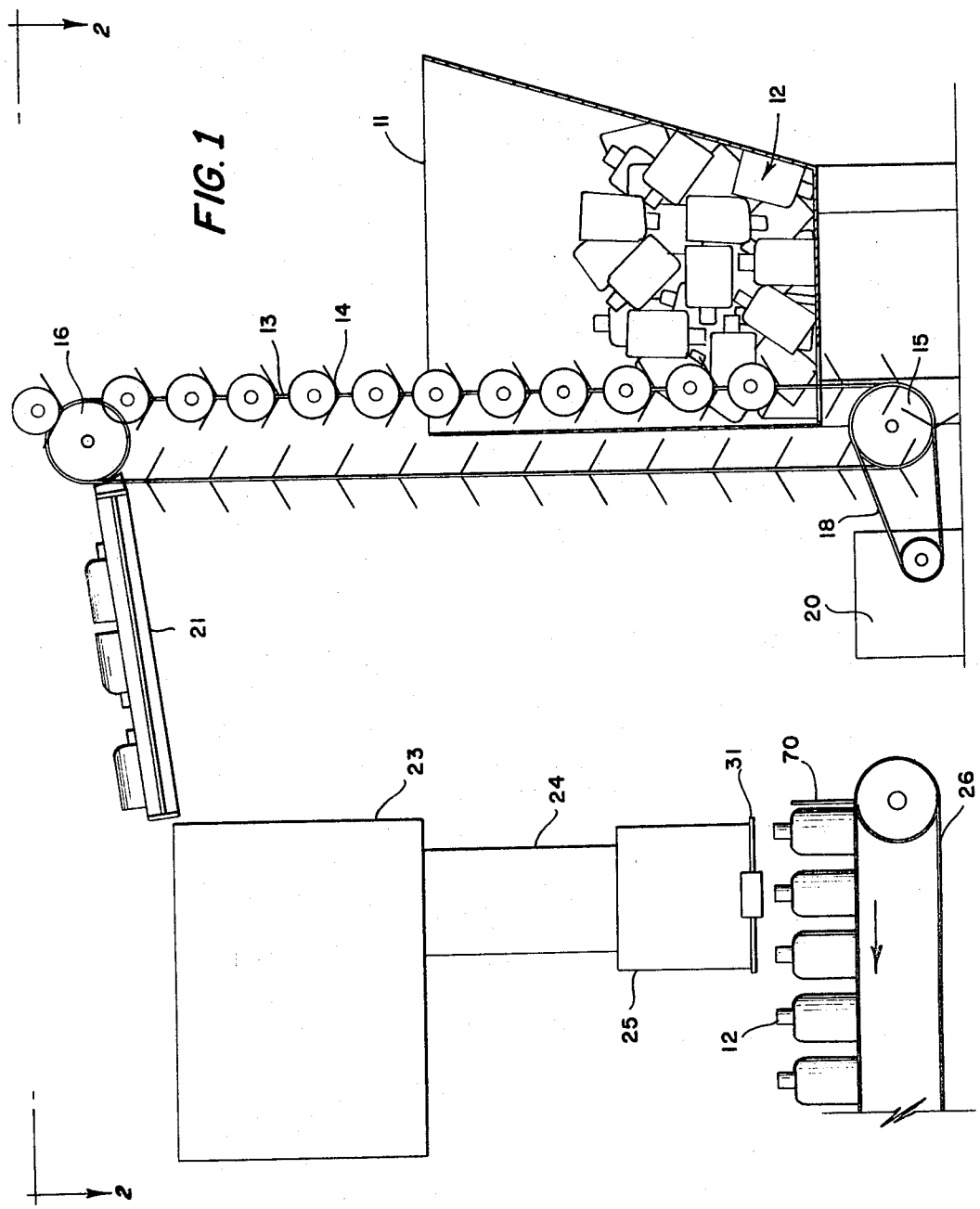
FIG. 1 is an elevation view of an unscrambling and orienting apparatus taken along line 1—1 of FIG. 2.
Figure 2:
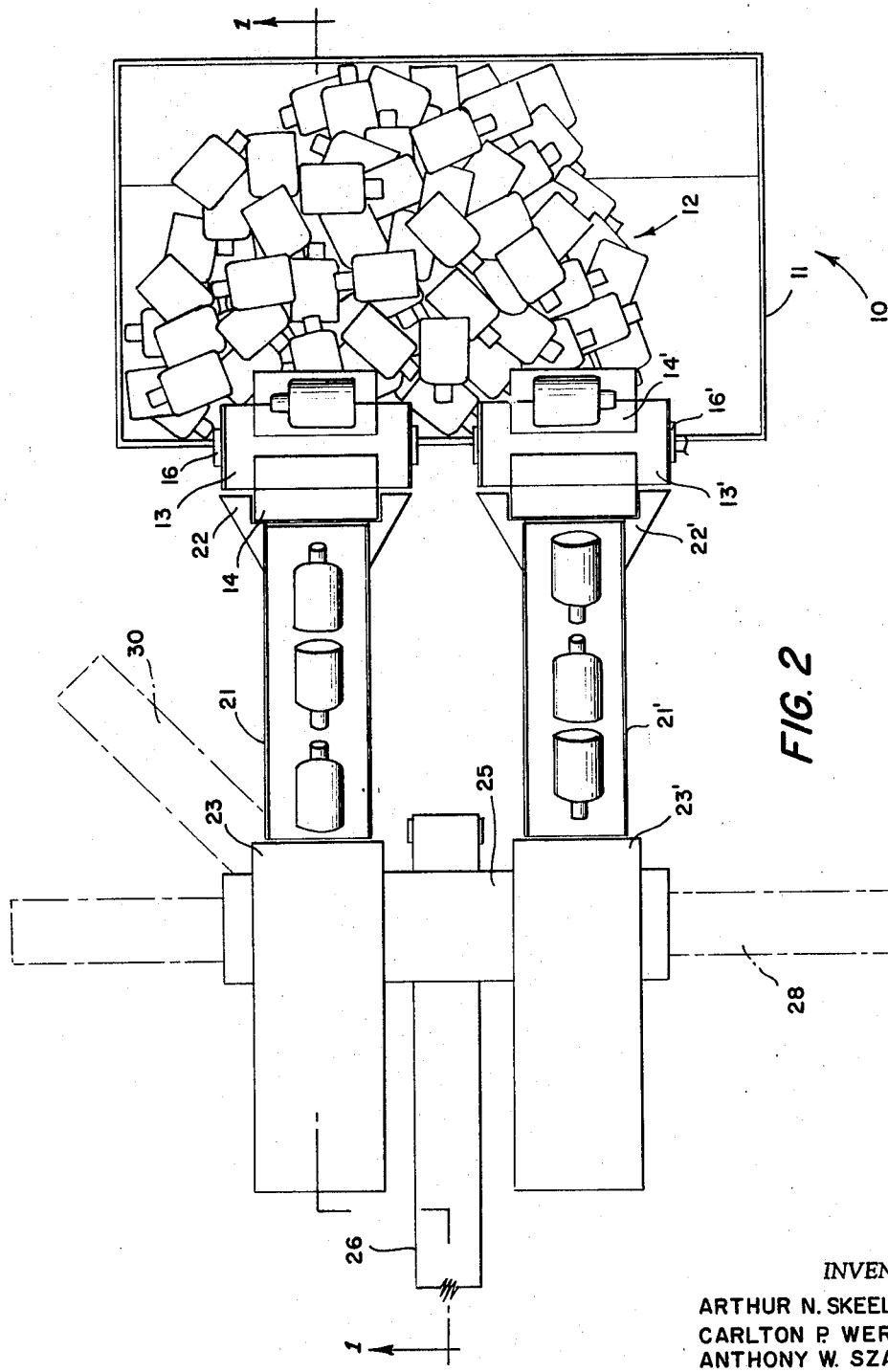
FIG. 2 is a plan view of the apparatus found in FIG. 1.

FIGS. 1 and 2 show the overall arrangement of the compact, convenient and versatile unscrambling and orienting apparatus of the present invention. It can be seen in FIG. 1 that the overall apparatus is compact and takes up very little floor space and can be easily adapted for use with any existing operating station. For instance, as indicated by the alternative feed away conveyors 28 and 30 in FIG. 2, the apparatus may be placed at any angle with respect to an existing conveyor belt of an existing container handling apparatus.

Briefly, the main portions of the apparatus 10 include a hopper 11 which receives a scramble batch of containers 12. The containers may be, for example, bottles such as plastic bottles. Referring to FIG. 1, the containers are picked up and carried upwardly by lift conveyor 13 having trays 14. At an upper level, accumulation conveyor 21 receives the containers from the lift conveyors and delivers the containers to the orienting mechanism 23. Referring to FIG. 2 there is provided one lift conveyor for each accumulation conveyor. For instance, in FIG. 2, lift conveyor 13 carries containers to accumulation conveyor 21 and lift conveyor 13' carries containers to the accumulation conveyor 21'. The containers are turned 90° as they pass through the chutes 22 and 22' so that they move along the accumulation conveyors in an end to end arrangement. The orienting mechanism 23 then receives the containers from the accumulation conveyors and delivers them, open end facing up (assuming they are of the type having one end open and one end closed), to the funnel 24. A shuttle 25 then receives the uniformly oriented containers from the orienting mechanism, one at a time, and delivers the containers one at a time to the feed away conveyor 26.

Movement of the lift conveyors 13 and 13' is provided by a conveyor drive means 20 which may be, for example, a motor and gear reducer or a gear reducer motor. Drive means 20 moves the belt 18 which, through drive pulley 15, moves the lift conveyors. The lift conveyors move about an idler and sprocket assembly 16 at the upper end of the lift conveyor.

The accumulation conveyors 21 and 21' are identical and are a type which has been found particularly suitable for use in the present apparatus, namely driven roller conveyors of the type shown in FIGS. 3 and 4. The driven roller conveyor comprises a pair of rollers 34 on which the containers rest. The rollers are parallel and slope downwardly as shown in FIG. 1 and rotate continuously in opposite directions as indicated by the arows in FIG. 3. This type of conveyor has several advantages over conventional conveyors. First, it will accommodate and feed containers of many sizes and shapes without any adjustment when changing from one size and/or shape to another. Secondly, the rate of flow of the containers may be speeded up or slowed down simply by controlling the speed of rotation of the driven rollers. This type of conveyors is of particular value in the apparatus in the present invention since, in keeping with the overall purpose of the invention, it is rather compact, in view of its adjustability and versatility.

The rollers 34, which rotate in opposite directions, are mounted on shafts 41 which protrude through end plates 35 and 35'. Side rails 33 prevent the containers from falling off the conveyor if the apparatus is jarred. Gears 37 are mounted at one end of the shafts 41 on the outer side of the end plate 35 by means of set screws 42. Drive gears 38, which are driven by a conventional driving means, then turn the gears 37 and 37' in opposite directions as indicated in FIGS. 3 and 4.

FIGS. 5 and 6 illustrate, in detail, the orienting, shuttle, and feed away conveyor mechanisms. Referring to FIG. 6, a pair of containers 12 having closed bottoms and open tops approach the orienting mechanism 23 along the accumulation conveyor 21'. The purpose of this conveyor is to maintain an accumulation of containers at the entrance to the orienting mechanism so that in the event that one or more of the trays fail to carry a container from the hopper, then nonetheless, the flow of containers through the orienting mechanism will be constant. The containers are positioned on the accumulation conveyor in end to end relationship but may have either the open end or the closed end facing the orienting mechanism. It is the purpose of the orienting mechanism to then deliver all of the containers so that the openings of the containers all face in the same direction.

Referring to FIG. 6, a rocker arm 81' having a stop gate 50' is rotatable about a pivot 51' to stop the flow of containers on the accumulation conveyor 21' just prior to orienting mechanism 23. Upon a given signal the rocker arm 81' pivots clockwise about pivot 51' so that gate 50' swings upwardly allowing one container at a time to fall onto sloped chute 52'. When the gate 50' is raised, a cushion 80' at the other end of the rocker arm 81' moves downwardly to engage the next container on the conveyor and prevent it from moving onto the slope 52'. The rocker arm then turns counterclockwise so that gate 50' again holds the remaining containers, until a signal is received to allow another container to be delivered to the orienting mechanism. As the containers move down the chute 52' they engage the hook end 58' of a swivel hook 54' which rotates about a pivot 56'. At the moment that the container contacts the swivel hook 54' the hook is held in its position by a latch 53'. This latch may be, for example, a permanent magnet which attracts a steel swivel hook 54'. The swivel hook 54' then swings to the left under the weight and inertia of the container. If the container in the chute 52' has its open end facing downwardly then the hook 58' will have entered the open end as the container arrived at the lower end of sloping chute 52'. Then, when the swivel hook 54 swings to the left, it carries the open end of the container to the left, as indicated by dotted lines in FIG. 6. This will place the container in such a position that the closed bottom end of the container will then fall downwardly, under the force of gravity, into funnel 55'. If, on the other hand, the container arriving at the lower end of the chute 52' has the closed bottom end facing downwardly, the bottom of the container will simply push the hook end 58' aside and fall, bottom first, into the funnel 55'. Thus in this manner all the containers fall, closed bottom end first, into the funnel 55' and are uniformly oriented. After the containers have passed, counterweight 57' causes the swivel hook 54' to return to the latch 53'.

Thus, it can be seen that unlike previously known orienting mechanisms, the mechanism of the present invention is extremely compact and yet performs the same result as obtained by previous larger, more complicated and more bulky orienting mechanisms. FIG. 5 shows two orienting paths which form the orienting mechanism. Each path of FIG. 5 works in a manner identical to that as described with respect to FIG. 6.

The movement of the stop gates 50 and 50' is controlled by the movement of a shuttle block 25. The shuttle block provides a mechanism for receiving containers from each of the two orienting paths and delivering the same to the feed away conveyor 65.

FIG. 5 shows a shuttle block 25 which is reciprocated to the right and left by a reciprocating means 60. In the position shown, the shuttle block is receiving a container from the funnel 55' in the opening 61 while it is delivering a container previously received from funnel 55 from a second opening 62 through a hole 63 in a fixed plate 31 to the feed away conveyor 65. The shuttle will then move to the left so that the container in opening 61 is positioned above the hole 63 so that it in turn will drop onto the conveyor 65, and simultaneously another container will fall from funnel 55 into the hole 62. In this manner the reciprocating shuttle receives containers from each of the two orienting paths of the orienting mechanism 23 and delivers the containers one at a time from the shuttle to a feed conveyor 65, below the hole 63 in the fixed plate 31.

As the containers fall through the opening 63 they are held on the conveyor so that they will not topple over. They are held on two sides by guide rails 68, in the back by a back stop 70, and in the front by the container preceding it on the conveyor. The conveyor 65 may move the bottles from the orienting mechanism in any direction, as indicated in FIG. 2 by alternative feed away paths 26, 28 or 30 for example.

In the operation of the orienting mechanism, the speed of the reciprocating movement of the shuttle block is determined by the speed of the conveyor 65. The shuttle block should go through one-half of its cycle as the conveyor belt moves the distance equal to the width of one container. In this manner the containers fall onto the conveyor in close proximity to the preceding containers so that the preceding containers may keep the newly placed containers from falling over. The movement of the shuttle block in turn determines the timing of the movement of the rocker arm stop gates 50 and 50'. The shuttle 25 in FIG. 5 has just lowered a container from hole 62 through hole 63 in the fixed plate 31 onto the conveyor belt 65 and is ready to carry another container now in the hole 61 to the hole 63. At a preselected moment a signal is transmitted to the rocker arm stop gate 50, opening the gate, and allowing a container to enter chute 52 where it will be properly oriented by hook 54 so that when the opening 62 moves directly beneath the funnel 55 the container will fall, correctly oriented, from the funnel 55 into the opening 62 in the shuttle block 25. In shuttle 25 it will rest on the fixed plate 31 until it is moved to the right over the opening 63 in the fixed plate 31 through which it will fall onto conveyor 65.

Summarizing the operation of the overall apparatus, a batch of elongated containers such as bottles are first dumped into the hopper 11. The lift conveyors 13 and 13' which are moved continuously by the drive means 20 through the belt 18 continuously carry containers in the trays 14 and 14' upwardly to the upper end of the accumulation conveyors 21 and 21'. If, for some reason the rocker arm stop gates at the other end of the accumulation conveyors do not open so that the containers pile up on the accumulation conveyors, a sensing means may be provided to sense a pile up of containers at the upper end of the accumulation conveyors to stop the movement of the lift conveyors. The containers then move along conveyors 21 and 21' in an end to end arrangement, but wherein the open end of the containers may be facing either direction. The containers are held by the rocker arm stop gates 50 and 51'. The conveyor belt 65 is moving at a certain speed which would be that speed required by the station to which the containers are to be delivered. This speed of the conveyor 65 then determines the speed of the reciprocating movemet of the shuttle block 25. The movement of the shuttle block 25 in turn controls the opening of the rocker arm stop gates 50 and 50'. Assuming now that a signal is transmitted to open a stop gate, a single container will be delivered past the accumulation conveyor and fall onto the chute. After a container passes a stop gate, the stop gate returns to its normal position to stop the next container before it can move onto the chute. The container on the chute engages the swivel hook, with either its open or closed end engaging the hook end 58'. The weight and inertia of the container then swings the swivel hook to the left allowing the container to fall into the funnel, the correctly oriented, in the manner discussed above. When the container falls to the bottom of the funnel it will be received in an appropriate opening within the shuttle block 25 from which it will be carried to the opening 63 where it will fall onto the belt 65 from which it will be carried away with the other containers to a subsequent station.

Thus, there has been provided an unscrambling and orienting mechanism which, in its entirety, presents an apparatus which is highly convenient and versatile in comparison with the more bulky and complicated previous unscrambling and orienting mechanisms.

Although there is specifically described above a specific embodiment which the present invention may assume in practice, it will be understood that this form is shown merely for purposes of illustration, and that the same may be modified and embodied in various other forms without departing from the spirit and scope of the appended claims. For example, for convenience, the operation of the apparatus has been discussed with respect to bottles opened at one end and closed at the other end. This does not preclude the use of the machine with containers arriving at the swivel hook in one of the two containers are open, it is only necessary to design and position the swivel hook of the orienting mechanism so that it will only act to reverse the orientation of the containers arriving at the swivel hook in one of the two possible positions. For example, if a container has a wider opening at one end than the other, the swivel hook can be designed to enter the larger opening and turn those containers, and be pushed aside by the shoulder at the end having tne smaller opening. Also, it would be possible to substitute for the permanent magnet latch means an electromagnet which can be selectively energized or deenergized to further control delivery of the containers from the sloped chute.

What is claimed is:

1. An apparatus for unscrambling and orienting elongated containers having a first end and a second end wherein at least the first end has an opening therein comprising: a hopper means for storing a random batch of containers, an orienting mechanism, at least a first and second accumulation conveyor for delivering containers end to end to the orienting mechanism, means for delivering containers from the hopper to the conveyors, said orienting mechanism including an orienting path for each conveyor, each orienting path being adapted to receive containers from the conveyor with which it is associated and to deliver all of the containers uniformly oriented, each orienting device comprising; a sloped chute for receiving containers from the conveyor, a swivel hook pivotally mounted for movement into the path of the containers at the lower end of the said chute, and a funnel mounted to receive containers delivered from the said chute, whereby the swivel hook is pushed aside by the containers positioned with their second end facing downwardly on the chute and the swivel hook enters the opening in the first end of the containers positioned first end down on the chute and swings the first end outwardly allowing the container to fall, second end first, into the funnel, a feed away conveyor, a shuttle means for receiving containers from the orienting mechanism one at a time, and delivering them to the feed away conveyor one at a time.

2. An apparatus as claimed in claim 1 including a stop gate for controlling the movement of containers from the said accumulation conveyors to the said chutes of the associated orienting path, and a latch means for holding the said swivel hook in the path of the containers on tne chute, and wherein the timing of the opening of the stop gate is responsive to the movement of the said shuttle means.

3. An apparatus as claimed in claim 2 wherein the said latch is a magnetic means.

4. An apparatus as claimed in claim 2 wherein the shuttle means comprises a shuttle block having openings therein for receiving containers from the funnels of the said orienting paths, a means for reciprocating the shuttle block, and affixed plate mounted beneath the shuttle block and having a hole therein for allowing the containers to fall from the hole in the shuttle block to the said feed away conveyor, the openings in the shuttle block and the fixed plate being so positioned that the shuttle block simultaneously receives a container from the funnel of one orienting path and delivers a container previously received from a funnel of another orienting path through the opening in tne fixed plate to the feed away conveyor.

5. An apparatus as claimed in claim 1 wherein the shuttle means comprises a shuttle block having openings therein for receiving containers from the funnels of the said orienting paths, a means for reciprocatng the shuttle block and a fixed plate mounted beneath the shuttle block and having a hole therein for allowing the containers to fall from the hole in the shuttle block to the said feed away conveyor, the openings in the shuttle block and the fixed plate being so positioned that the shuttle block simultaneously receives a container from the funnel of one orienting path and delivers the container previously received from a funnel of another orienting path through the opening in the fixed plate to the feed away conveyor.

6. An apparatus as claimed in claim 5 wherein the speed of the reciprocating movement of the shuttle is dependent upon the speed of the feed away conveyor.

7. An apparatus as claimed in claim 5 wherein the said feed away conveyor comprises a conveyor belt, a pair of side rails, and a back stop, said side rails and said back stop being positioned below and immediately adjacent the said opening in the fixed plate of the shuttle means.

8. An apparatus as claimed in claim 1 wherein the speed of the reciprocating movement of the shuttle is determined by the speed of the feed away conveyor.

9. An apparatus as claimed in claim 1 wherein the said conveyor is a roller conveyor and comprises a pair of parallel rotating members which are mounted to rotate in opposite directions, said rotating rollers being sloped downwardly and being so positioned that the containers to be conveyed rest on both of the rollers.

10. An apparatus as claimed in claim 9 wherein the said means for delivering containers comprises an endless belt having mounted thereon a plurality of trays, said belt being positioned to carry the trays through the said hopper so that each tray carries containers from the hopper upwardly to the said accumulation conveyor.

11. An apparatus for unscrambling and orienting elongated containers having a first end and a second end wherein at least the first end has an opening therein comprising; a hopper means for storing a random batch of containers, an orienting mechanism, a first accumulation conveyor and a second accumulation conveyor for delivering containers end to end to the orienting mechanism, a first and a second endless belt for carrying containers from the hopper to the first and second accumulation conveyors respectively, each endless belt having mounted thereon a plurality of trays, said trays each adapted to carry containers, said orienting mechanism including two orienting paths one associated with each said accumulation conveyor, wherein each orienting path is adapted to receive containers from the accumulation conveyor with which it is associated and to deliver all of the containers uniformly oriented, each orienting path comprising; a sloped chute for receiving containers from the respective conveyor, a swivel hook pivotally mounted for swinging movement into the path of the containers at the lower end of the said chute, and a funnel mounted to receive containers delivered from the said chute, whereby the swivel hook is pushed aside by the containers positioned with their second end facing downwardly on the chute and the swivel hook enters the opening in the first end of the containers positioned first end down on the chute and swings the first end outwardly allowing the container to fall, second end first, into the funnel, a feed away conveyor, a reciprocatory shuttle means for alternately receiving containers from each of the two orienting paths of the orienting mechanism, and delivering the containers alternately to the feed away conveyor.

12. An apparatus as claimed in claim 11 including a stop gate for controlling the movement of containers from the said accumulation conveyors to the said chutes of the associated orienting device, and a latch means for holding the said swivel hook of the path in the path of the containers on the chute, and wherein the operation of the stop gate is responsive to the movement of the said shuttle means.

13. An apparatus as claimed in claim 12 wherein the shuttle means comprises a shuttle block having openings therein for receiving containers from the funnels of the said orienting paths, a means for reciprocating the shuttle block, and a fixed plate mounted beneath the shuttle block and having a hole therein for allowing the containers to fall from the hole in the shuttle block to the said feed away conveyor, the openings in the shuttle block and the fixed plate being so positioned that the shuttle block simultaneously receives a container from the funnel of one orienting path and delivers the container previously received from a funnel of another orienting path through the opening in the fixed plate to the feed away conveyor.

14. An orienting mechanism for orienting elongated containers having a first end and a second end, wherein at least said first end has an opening therein, comprising: a sloped chute, a means for regulating the movement of containers onto the said sloped chute, a swivel hook pivotally mounted for movement into the path of the containers on the chute, a latch means for holding the said swivel hook in the path of the containers on the chute, a funnel means positioned to receive containers delivered from the lower end of the chute whereby the swivel hook is pushed aside by the containers positioned with their second end facing downwardly on the chute and the swivel hook enters the opening in the first end of the containers positioned first end down on the chute and swings the first end outwardly allowing the container to fall, second end first, into the funnel.

References Cited

UNITED STATES PATENTS

| | | | |
|---|---|---|---|
| 635,588 | 10/1899 | Pondorf | 221—72 |
| 1,278,463 | 9/1918 | Heim | 198—33 |
| 2,639,824 | 5/1953 | Shannon | 221—116 |
| 2,734,620 | 2/1956 | Fisher | 221—175 |
| 2,962,844 | 12/1960 | Orlando | 198—33.4 |

FOREIGN PATENTS 437,350  11/1926  Germany.

RICHARD E. AEGERTER, *Primary Examiner.*

EVON C. BLUNK, *Examiner.*